US012751382B2

(12) United States Patent
Peters et al.

(10) Patent No.: US 12,751,382 B2
(45) Date of Patent: Oct. 6, 2026

(54) MULTI-TASK BLOWER PLATFORM, DEVICE AND SYSTEM

(71) Applicants: Clifford Peters, Clearwater, FL (US); Christine Peters, Clearwater, FL (US)

(72) Inventors: Clifford Peters, Clearwater, FL (US); Christine Peters, Clearwater, FL (US)

( * ) Notice: Subject to any disclaimer, the term of this patent is extended or adjusted under 35 U.S.C. 154(b) by 239 days.

(21) Appl. No.: 18/773,201

(22) Filed: Jul. 15, 2024

(65) Prior Publication Data

US 2025/0081901 A1 Mar. 13, 2025

Related U.S. Application Data

(62) Division of application No. 17/512,170, filed on Oct. 27, 2021, now Pat. No. 12,035,661.

(60) Provisional application No. 63/106,203, filed on Oct. 27, 2020.

(51) Int. Cl.
*A01G 20/47* (2018.01)
*E01H 1/08* (2006.01)

(52) U.S. Cl.
CPC ........... *A01G 20/47* (2018.02); *E01H 1/0809* (2013.01)

(58) Field of Classification Search
CPC .............................. A01G 20/47; E01H 1/0809
See application file for complete search history.

(56) References Cited

U.S. PATENT DOCUMENTS

| | | | | | |
|---|---|---|---|---|---|
| 3,776,459 | A * | 12/1973 | Bonvicini | A01M 7/0003 | 239/379 |
| 5,768,749 | A * | 6/1998 | Ohi | A01G 20/47 | 15/328 |
| 6,409,097 | B1 * | 6/2002 | McCauley | B05B 7/1413 | 239/289 |
| 6,793,563 | B2 * | 9/2004 | Daniel | B24C 5/02 | 451/99 |
| 6,928,693 | B1 * | 8/2005 | Ericson | A47L 5/14 | 15/327.5 |
| 7,559,490 | B2 * | 7/2009 | Rappin | B05B 7/2435 | 239/289 |
| 7,600,290 | B1 * | 10/2009 | Peters | A47L 5/36 | 15/327.5 |
| 7,766,256 | B2 * | 8/2010 | Loaces | A01D 43/14 | 239/340 |
| 8,177,914 | B2 * | 5/2012 | Peters | E01H 1/0809 | 15/327.5 |
| 8,671,516 | B1 * | 3/2014 | Mendez | A01G 20/47 | 15/327.5 |
| 10,165,738 | B2 * | 1/2019 | Haramoto | F04D 25/0673 | |
| 11,617,312 | B2 * | 4/2023 | Zhou | F04D 25/0673 | 417/234 |
| 2004/0007402 | A1 * | 1/2004 | Kujawa | B62D 51/06 | 180/53.8 |

(Continued)

FOREIGN PATENT DOCUMENTS

WO WO-2018176295 A1 * 10/2018 ........... E01H 1/0863

*Primary Examiner* — Marc Carlson
(74) *Attorney, Agent, or Firm* — Akerman LLP

(57) ABSTRACT

According to one example, a multi-tool system for use in lawn maintenance and care. In use, one example provides the user with ambidextrous blowing capabilities, the ability to spray fertilizers, herbicides and pesticides, and use one or more spline drive tools at the same time as the blower and spray systems. A mobile multi-tool system for use in lawn maintenance and care.

17 Claims, 22 Drawing Sheets

(56) References Cited

U.S. PATENT DOCUMENTS

| | | | | |
|---|---|---|---|---|
| 2008/0173000 | A1* | 7/2008 | Skinner | A01D 69/002 56/16.9 |
| 2009/0044835 | A1* | 2/2009 | Peters | E01H 1/0809 134/25.1 |
| 2010/0133365 | A1* | 6/2010 | Bailey | E01H 1/0809 239/663 |
| 2016/0150922 | A1* | 6/2016 | Restall | A01G 20/47 29/428 |
| 2016/0152256 | A1* | 6/2016 | Restall | E01H 1/0809 137/899 |
| 2016/0227694 | A1* | 8/2016 | Bermudez | A01G 3/062 |
| 2016/0286731 | A1* | 10/2016 | Smith | A01G 20/47 |
| 2017/0273251 | A1* | 9/2017 | Haramoto | F04D 25/16 |
| 2017/0273252 | A1* | 9/2017 | Haramoto | A47L 5/14 |
| 2020/0084978 | A1* | 3/2020 | Weihl | B62D 51/04 |
| 2020/0245569 | A1* | 8/2020 | Roth | A01G 20/47 |
| 2020/0296893 | A1* | 9/2020 | Bohrer | A01G 20/47 |
| 2022/0124989 | A1* | 4/2022 | Peters | A01G 20/47 |
| 2022/0186745 | A1* | 6/2022 | Anania | A01G 20/47 |

* cited by examiner

MULTI-TASK BLOWER PLATFORM, DEVICE AND SYSTEM

REFERENCE TO RELATED APPLICATION

The present invention is a divisional application of U.S. application Ser. No. 17/512,170, filed Oct. 27, 2021, now U.S. Pat. No. 12,035,661, which claims priority to U.S. Provisional Application No. 63/106,203, filed Oct. 27, 2020, and titled "Multi-Task Transformable Blower Housing With Convertible Adaptor Kits," both of which are incorporated in their entirety herein by reference.

FIELD OF THE INVENTION

The present application relates to outdoor power equipment used in lawn, garden and yard care.

BACKGROUND

For thousands of years, land owners and caretakers have undertaken great efforts to groom and maintain their properties, including lawns and gardens. Successfully grooming and maintaining lawns and gardens has always required constancy, skill, time and energy. Given the laborsome nature of such requirements, a number of tools have been developed to increase the efficiency of lawn and garden grooming and maintenance. With the advent of the motor, a large suite of those tools were motorized for the sake of efficiency and speed. These tools include, among others, blowers to disperse loose debris, grass cuttings and the like; edgers to maintain borders; and line trimmers to cut back weeds and grass. Another suite of equipment was also developed to apply fertilizers, herbicides, and pesticides.

Unfortunately, lawn care tools suffer from a number of drawbacks. Blowers, in particular, present unique challenges to the user. For example, blowers generally permit only one-handed use on a predetermined side of the user, thus preventing users from selecting a preferred hand to blow with. This greatly limits users whose non-dominant hand happens to be that of the predetermined side. It also limits users who may want to blow with their non-dominant hand while performing a more complicated activity with their dominant hand. These limits lead to considerable discomfort in the user. Considering that many lawn care professions spend hours on a daily basis using a blower, such discomfort can lead to long term physical injuries or pains.

Further, present lawn care tools require sequential use. That is, for example, a user must first trim or edge, and then blow an area. In other instances, a user must first complete lawn mowing, trimming, edging and blowing, only to turn to the application of fertilizers, herbicides and pesticides to the lawn. This sequential approach seriously prolongs the amount of time to complete the entire project. It also requires additional effort and energy to return to the area where tools are maintained to exchange one tool for another. Given the time and distances involved and the weight of tools, this leads to markedly longer overall lawn care times and user fatigue. Indeed, because users are often completing lawn care under punishing weather conditions, every minute saved per day is meaningful, particularly for professional users.

Another drawback to current systems is the need to use multiple motors dedicated to a specific tool(s). This can lead to premature wear on each motor, as they must be started and re-started with greater frequency. The use of multiple motors, of course, also requires additional fuel, fueling time and maintenance of more motors. In all, this leads to a significant increase in the cost of ownership for such devices, as well as increased fuel consumption costs.

Therefore, there exists a long-felt need for a device that improves upon or resolves these drawbacks.

SUMMARY

One or more of the preceding drawbacks is resolved or improved upon by embodiments of the blower disclosed herein. It is the claims only that define the scope of the invention, and no part of the summary should be read to limit the scope of the claims.

In one embodiment, a motorized lawn and leaf blower is disclosed. The blower includes a motor with a drive shaft that spins an impeller. It also has a housing containing the impeller. A swivel tube is removably connected to a port in the housing, and permits both right and left handed operation of the blower tube. The swivel tube can be connected to the housing with a slide frame that slides into a rail on the housing. Additionally, the blower can be provided with a tank system that permits misting of a liquid fertilizer, herbicide or pesticide.

In one embodiment, a blower with a spline housing, and a split hub differential is disclosed. The split hub differential is driven by the motor drive shaft of the blower. In this way, a spline drive tool having a working end and a drive end can be readily connected and disconnected from the split hub differential, thus providing for multi-tool operability. For example, the split hub differential permits the use of a line trimmer or an edger and other useful tools in connection with the blower.

In one embodiment, a motorized lawn and leaf blower is disclosed. The lawn and leaf blower has a motor having a drive shaft; an impeller connected to the drive shaft, wherein the drive shaft is configured to spin the impeller, and a housing containing the impeller. The housing has a port for connection to a manifold. The manifold has a plenum, a first runner fluidly connected to the plenum, a second runner fluidly connected to the plenum, and a connector, which is removably attached to the tube connector. As disclosed, the housing, the port and the manifold are fluidly connected. Further, an adjustable flow control flap is pivotably connected to the plenum. Further still, the motorized lawn and leaf blower can be provided with a frame connected to the housing and a tank removably connected to the frame. A tube is used to connect the tank to the manifold, thereby forming a fluid connection between the tank and the manifold and allowing misting of fertilizers, herbicides and pesticides through the runners. Optionally, a multi-tool spline hub is provided to permit use of edgers, line trimmers and other tools at the same time as the blower.

In one embodiment, the motorized lawn and leaf blower is provided with twin impellers that provide air to respective runners of the manifold.

These and other features of the present blower platform are described in the following detailed description, drawings, and appended claims.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Parts List

Figure 1:
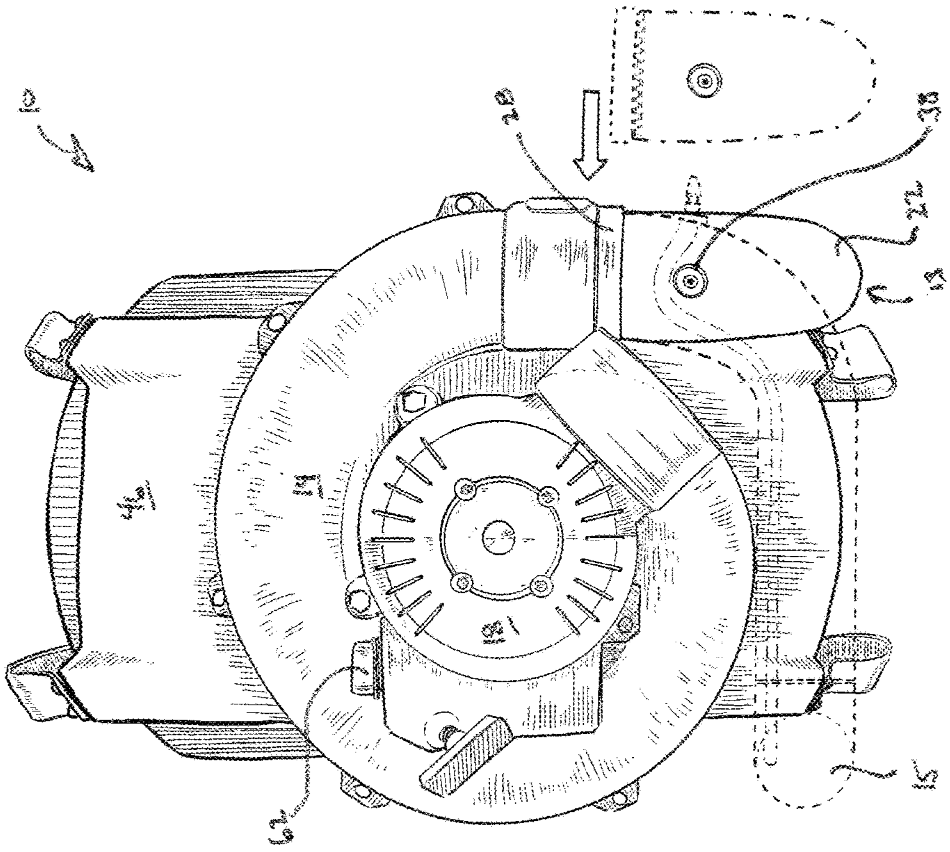
FIG. 1 illustrates a rear view of one embodiment of the systems and devices, and their various components, disclosed herein.

10, 210, 310, 410 platform
13 right handed use
14, 214, 314, 414 impeller housing
15 left handed use
18, 218, 318, 418 motor
22 blower elbow
24 swivel
25 direction of travel
28 port
30, 230, 330 connector frame
34, 234, 334, 434 connector frame receiver rail
38, 238, 338 mist port
42, 242, 342 extension elbow
46, 246, 346, 446 backpack
50, 250, 350, 450 latch
54, 254, 354, 454 spline drive housing
58, 258, 358, 458 spline receiver
62, 262, 362, 462 fuel tank
224, 228, 324, 328, 424, 428 runner
225, 325, 425 plenum
231, 331, 431 manifold
229, 248, 329, 348, 429, 448 blower tube
266 three-way flow control knob
268, 368, 468 flow control flap
272, 372, 472 internal mist tube
276 front impeller
280 rear impeller
378 tank base
384 spray tank 1
388 spray tank 2
392 3 way valve
396 tank port
398 feeder tube
399 tank cradle
402 rigid spline rod
404 spline driven hand tool
412 tool mount
431 blower end
433 blower flaps
435 direction of air travel
455 power shaft
459 spline sleeve
461 spline gear
463 spline drive shaft
465 spline drive split hub differential
467 differential bevel gear
473 mist tube flow valve
475 blower control handle
477 air flow dampener
478 throttle
480 cart The following detailed description and the appended drawings describe and illustrate exemplary embodiments of the invention solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings are not to scale and in certain instances details have been omitted, which are not necessary for an understanding of the present invention, such as conventional details of fabrication and assembly.

Figure 2:
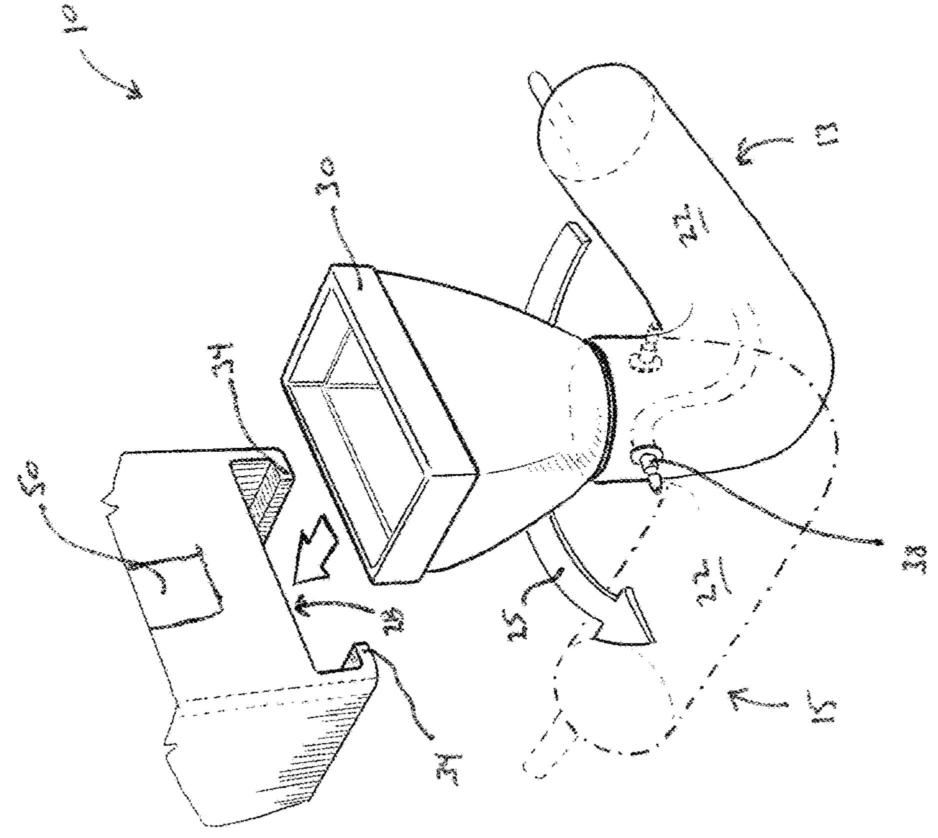
FIG. 2 illustrates a partial perspective view of one embodiment of the systems and devices, and their various components, disclosed herein.
Figure 3:
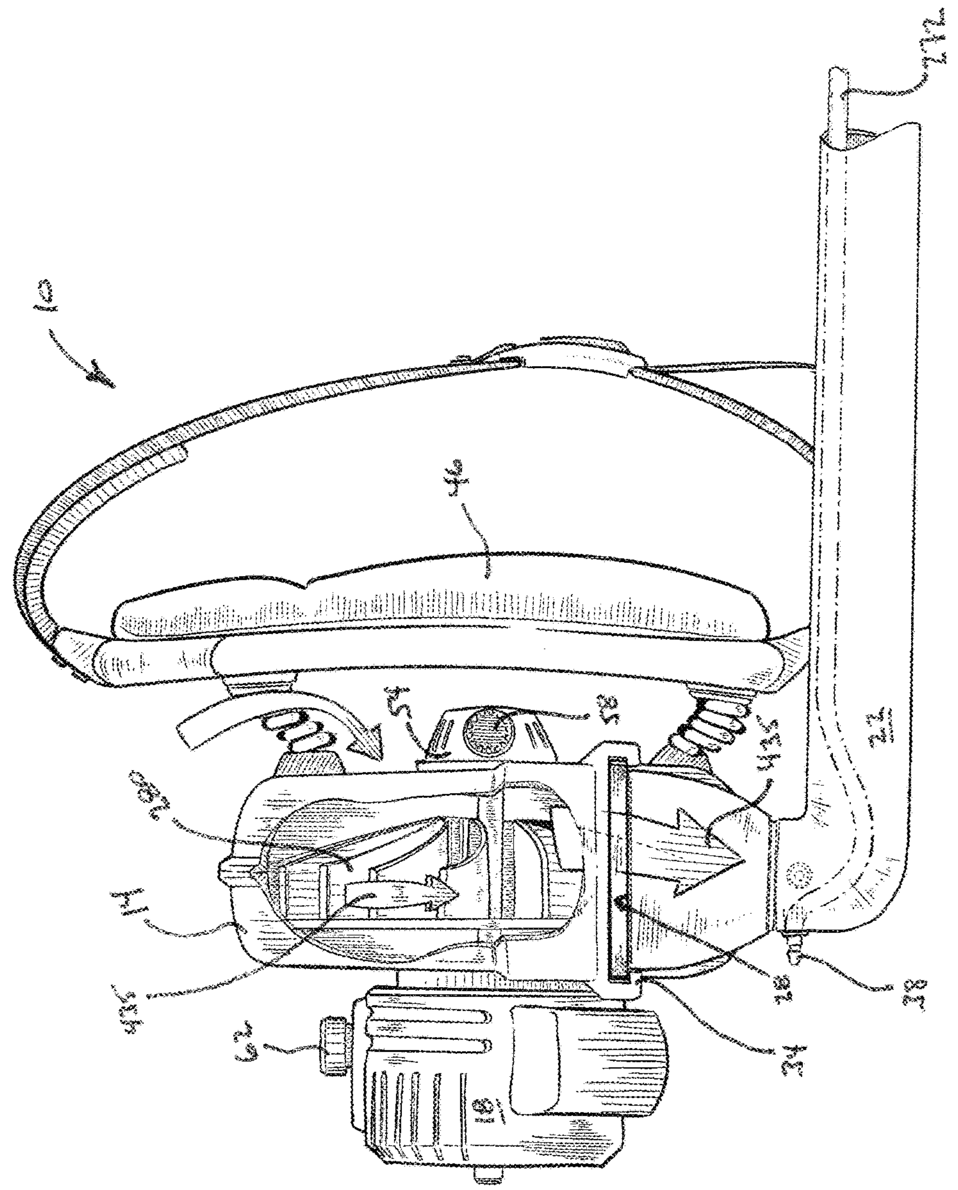
FIG. 3 illustrates a side view of one embodiment of the systems and devices, and their various components, disclosed herein.
Figure 3A:
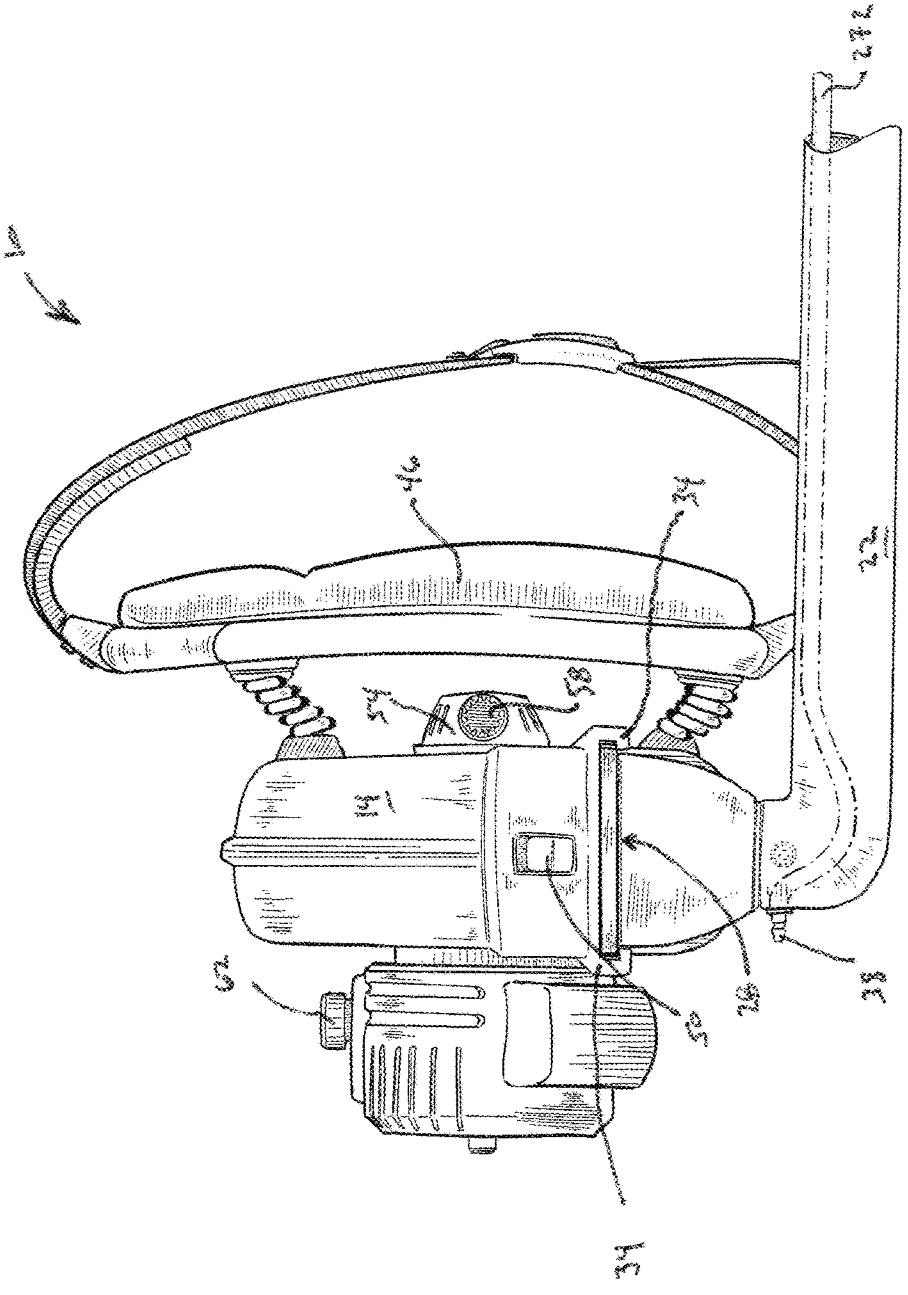
FIG. 3A illustrates a side view with a partial cutaway of a housing of one embodiment of the systems and devices, and their various components, disclosed herein.

Referring first to FIGS. 1-2, one embodiment of the present invention generally includes a motorized blower 10 having an impeller housing 14, a motor 18 a backpack 46, a port 28. As depicted in FIGS. 1 and 2, blower 10 further includes a blower elbow 22 that swivels between a position 13 that facilitates right-handed use and a position 15 that permits left handed use. When used in position 15, an extension elbow 42 (or, alternatively, an accordion type tube) is provided to allow the blower passageway to extend behind and around the user. As depicted in detail in FIG. 2, blower elbow 22 is connected to port 28 by way of connector frame 30, which slides over rails 34 into position below port 28, and as depicted in FIG. 3, is secured with latch 50 (or latches 250, 350 and 450 in other Figs). Blower elbow further includes a swivel 24 that permits a user to swivel blower elbow 22 in the direction of travel shown by arrow 25. It will be apparent to one of ordinary skill in the art will recognize that a mirror configuration of this embodiment would simply swap the right and left handed configurations.

Figure 4:
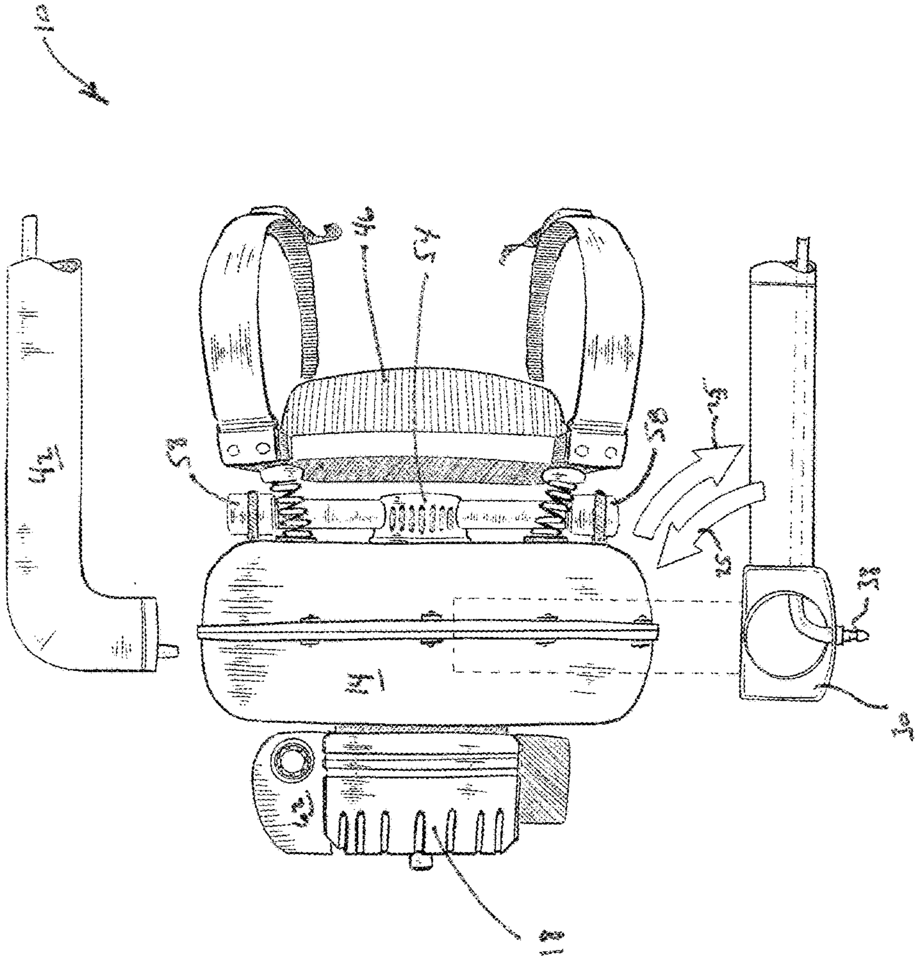
FIG. 4 illustrates a top view of the embodiment of FIGS. 1-3.
Figure 5:
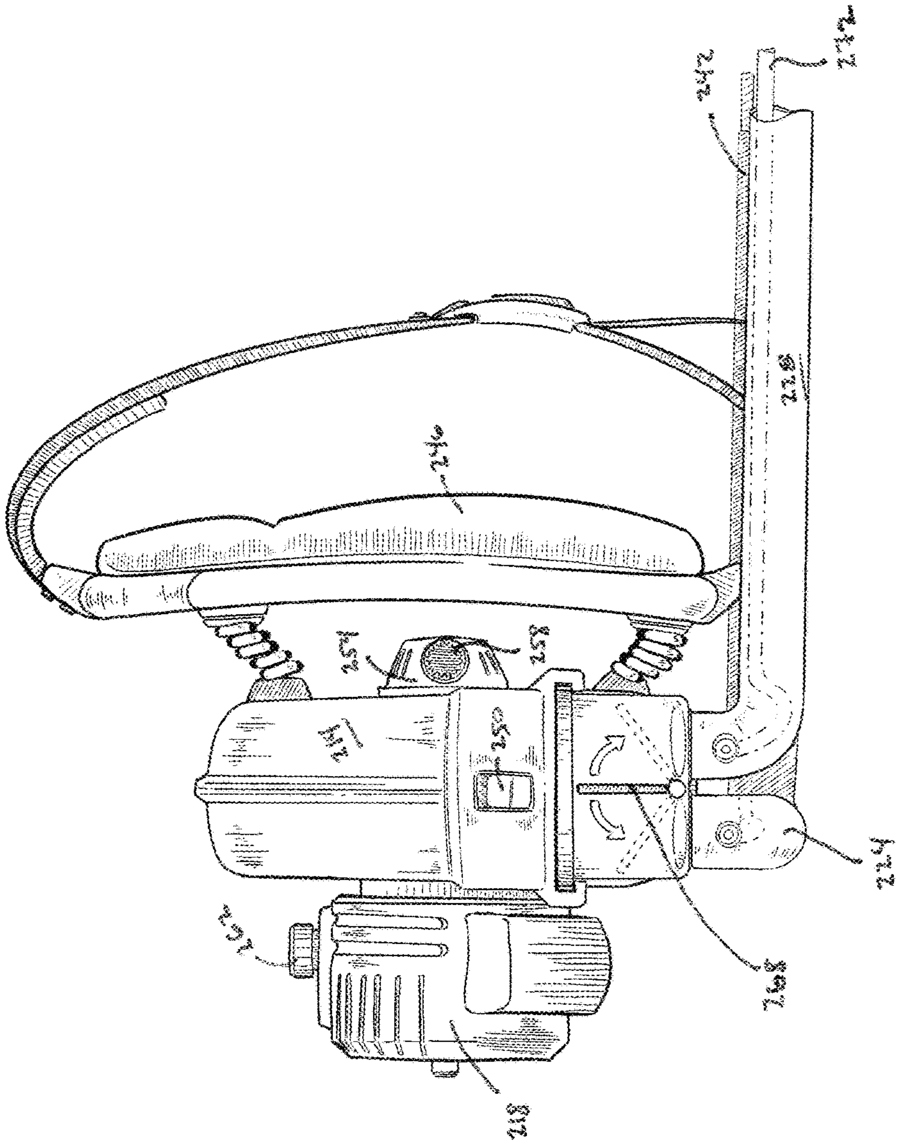
FIG. 5 illustrates a side view of a second embodiment of the systems and devices, and their various components, disclosed herein.
Figure 6:
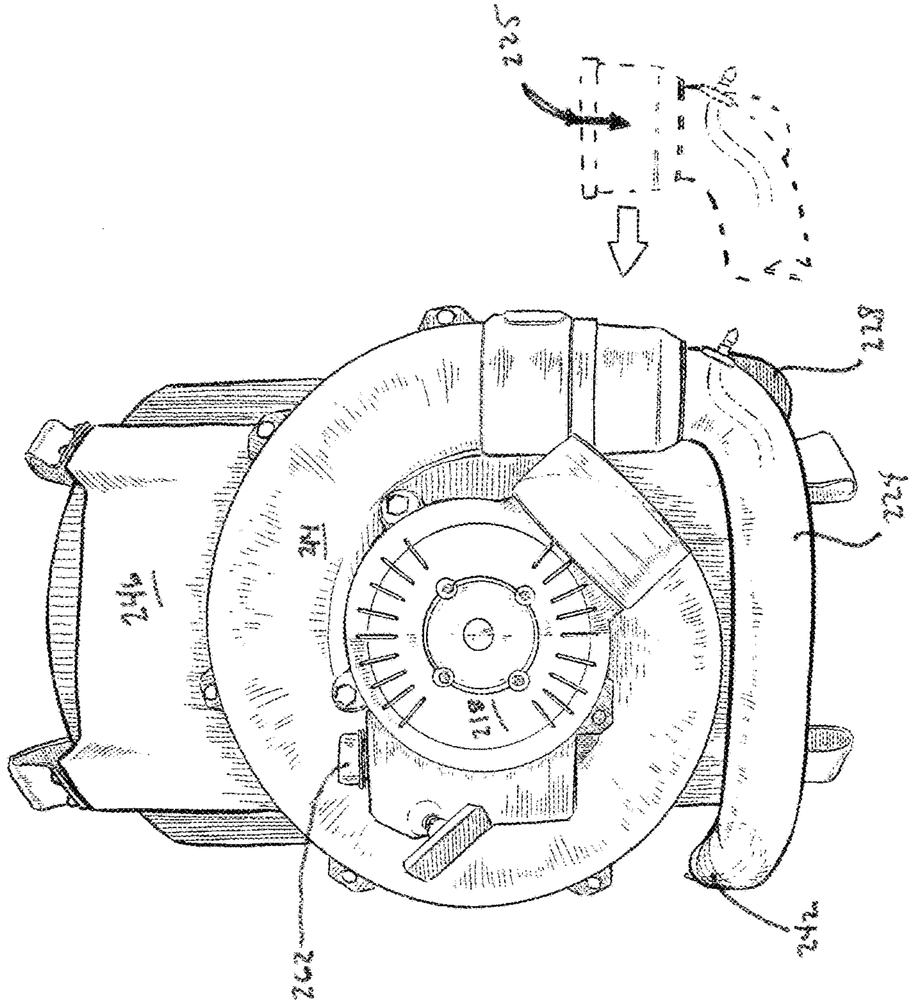
FIG. 6 illustrates a rear view of a second embodiment of the systems and devices, and their various components, disclosed herein.
Figure 7:
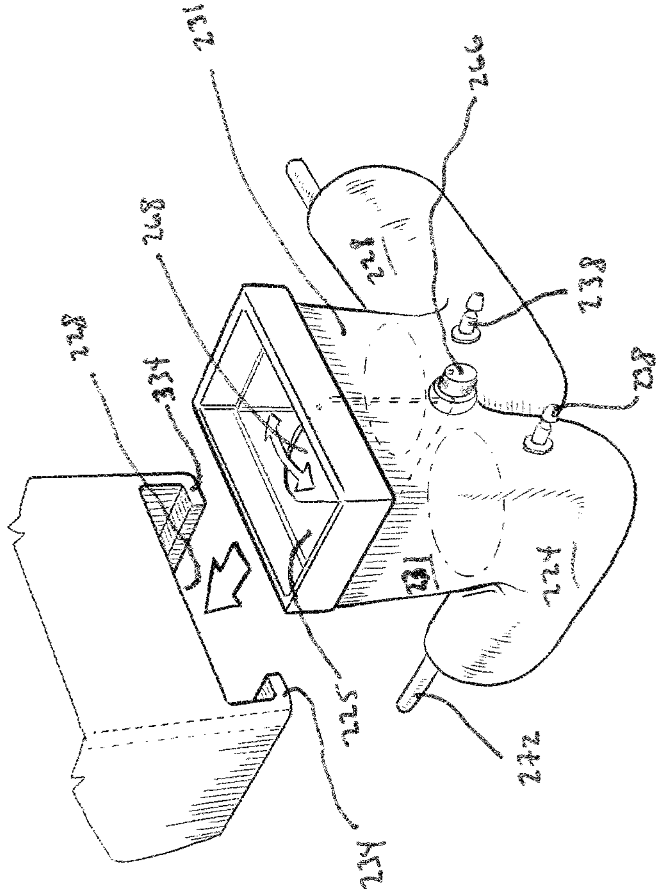
FIG. 7 illustrates a partial perspective view of a second embodiment of the systems and devices, and their various components, disclosed herein.
Figure 9:
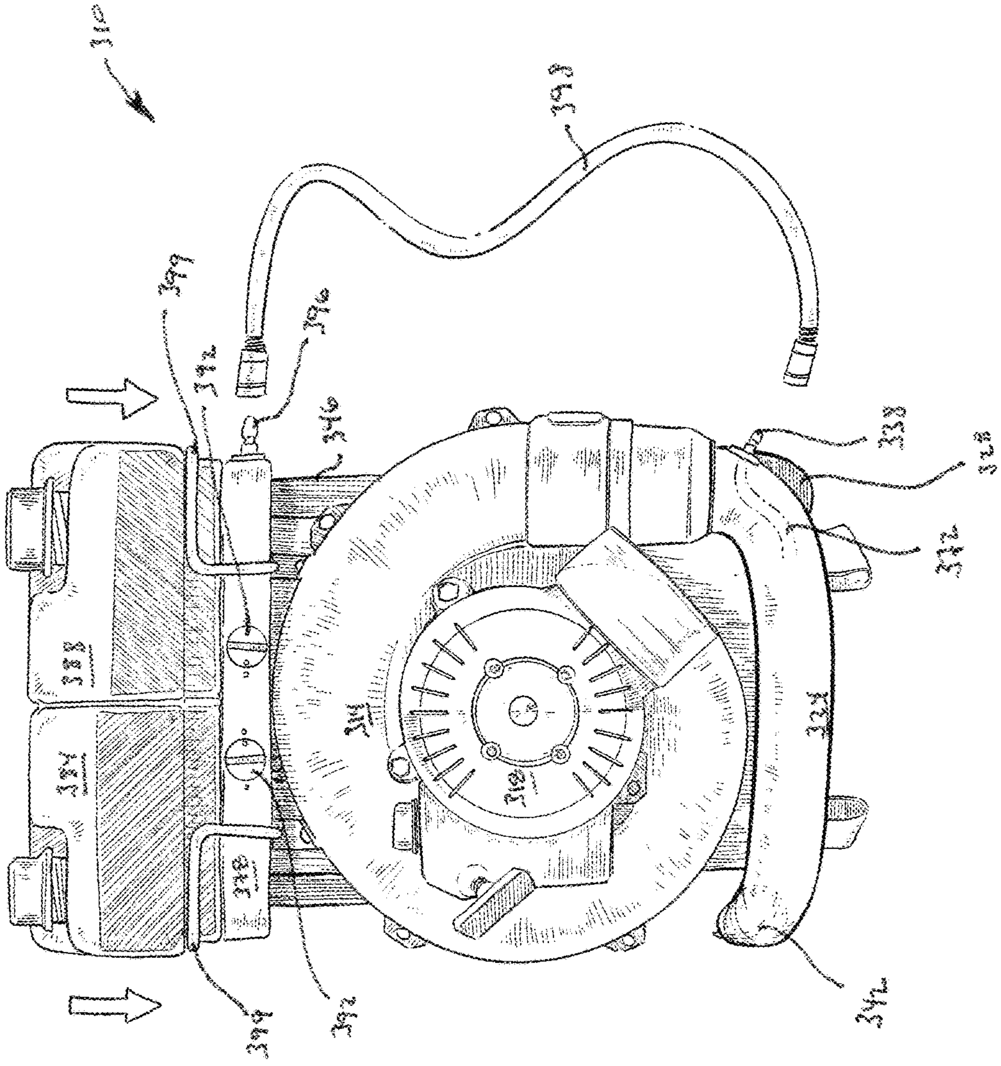
FIG. 9 illustrates a rear view of a third embodiment of the systems and devices, and their various components, disclosed herein.
Figure 10:
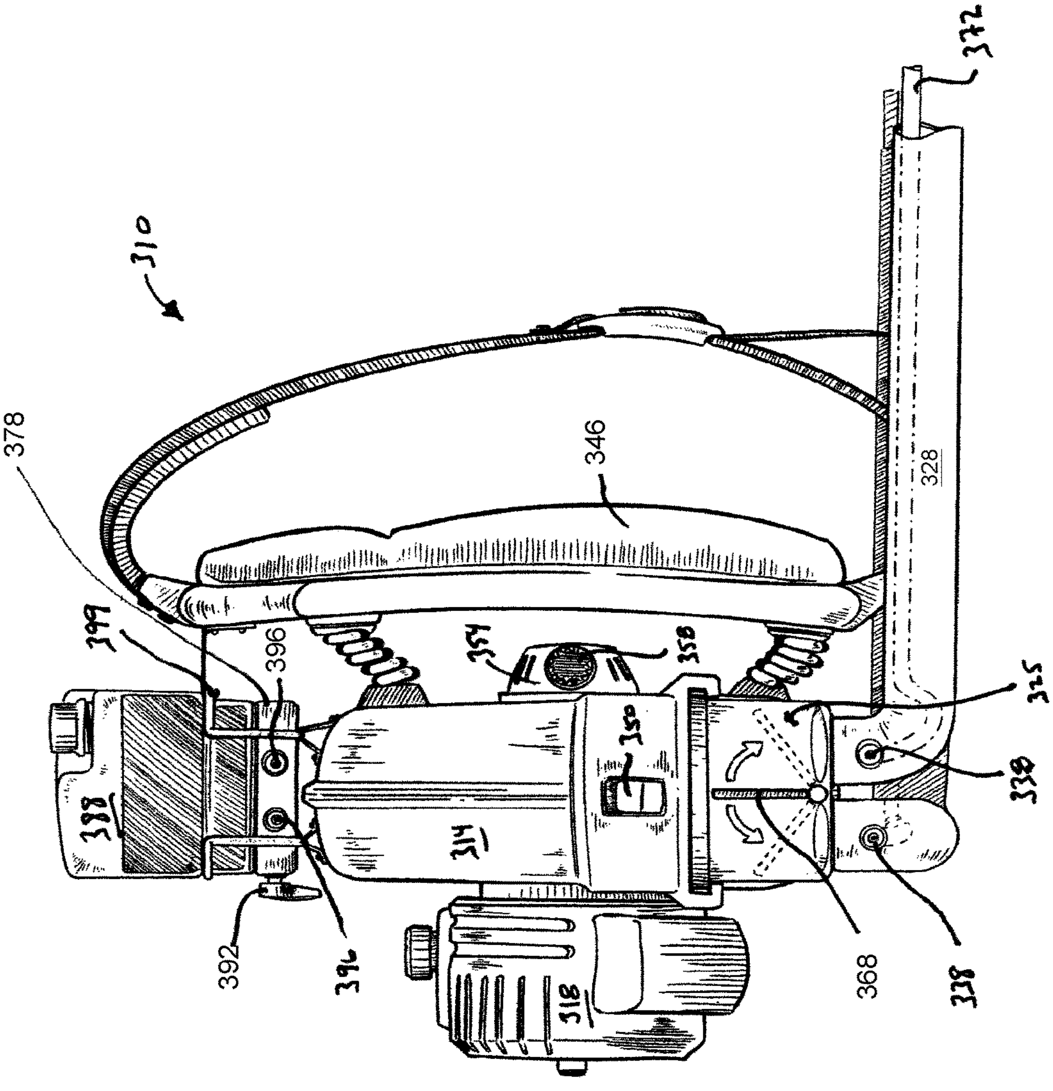
FIG. 10 illustrates a side view of a third embodiment of the systems and devices, and their various components, disclosed herein.
Figure 12:
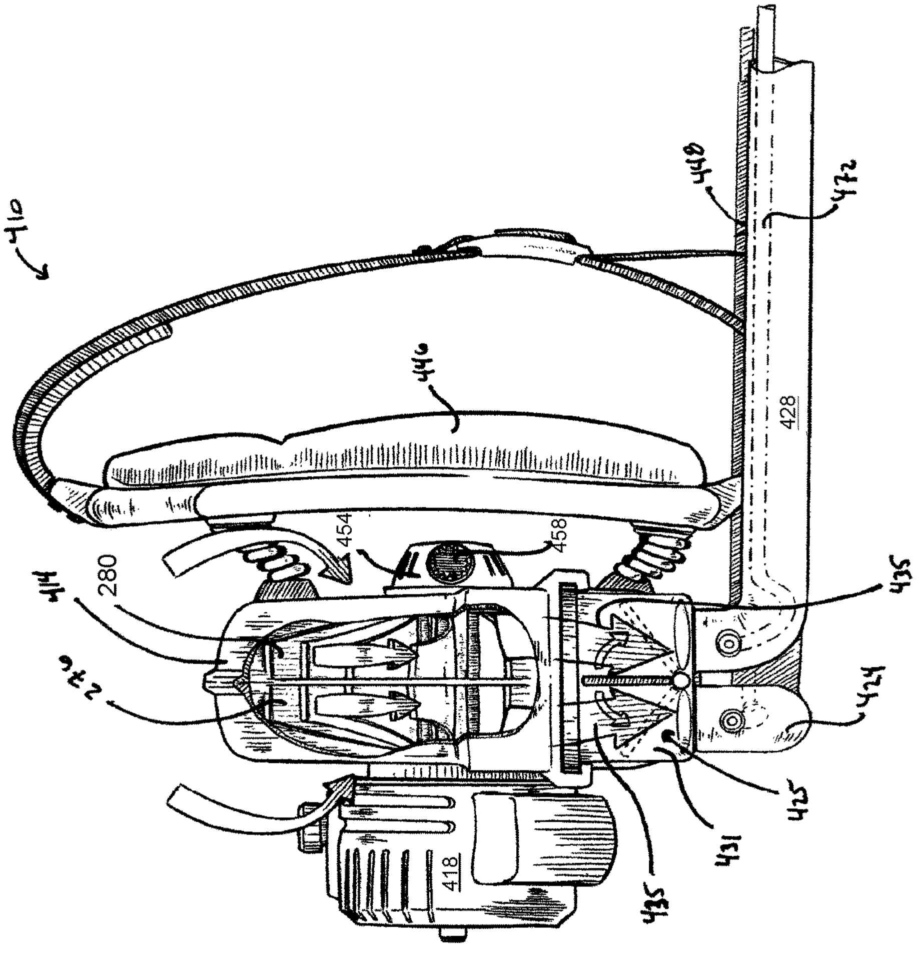
FIG. 12 illustrates a side view of a fourth embodiment of the systems and devices, and their various components, disclosed herein.
Figure 12A:
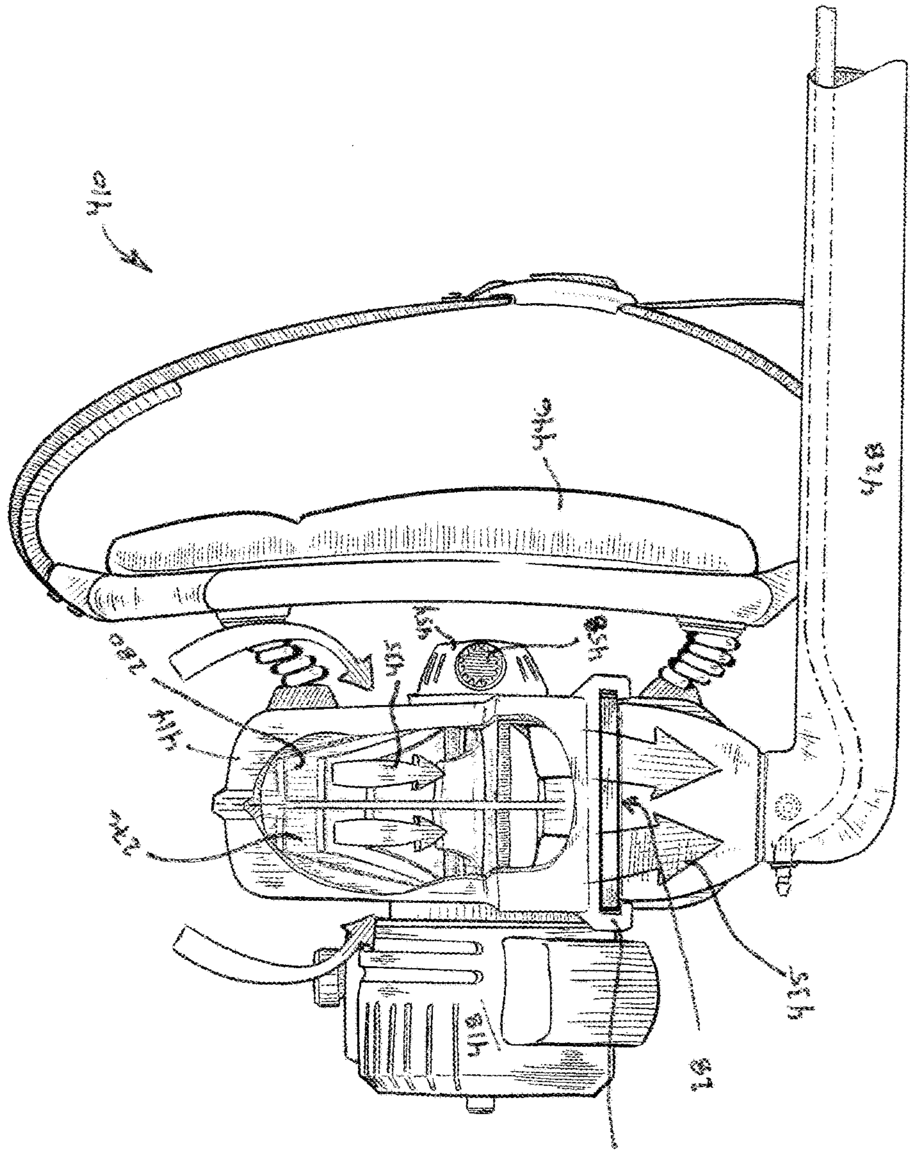
FIG. 12A illustrates a side view of a fourth embodiment of the systems and devices, and their various components, disclosed herein.
Figure 13:
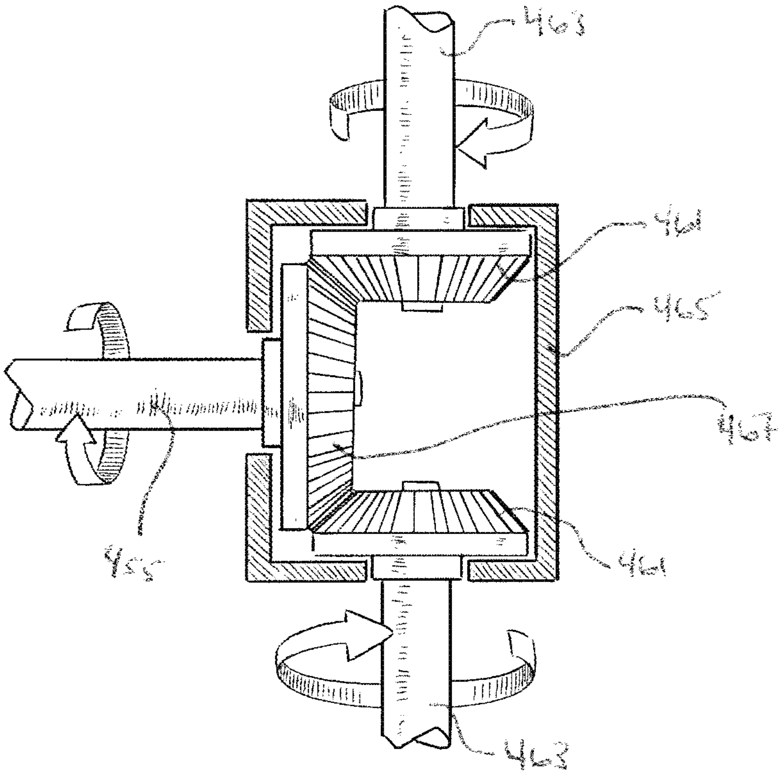
FIG. 13 illustrates a partial cutaway top view top view of a fourth embodiment of the systems and devices, and their various components, disclosed herein.
Figure 14:
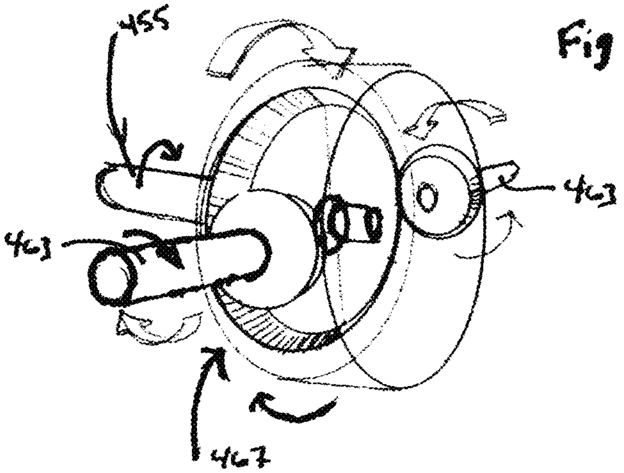
FIG. 14 illustrates a partial perspective side view of a fourth embodiment of the systems and devices, and their various components, disclosed herein.
Figure 15:
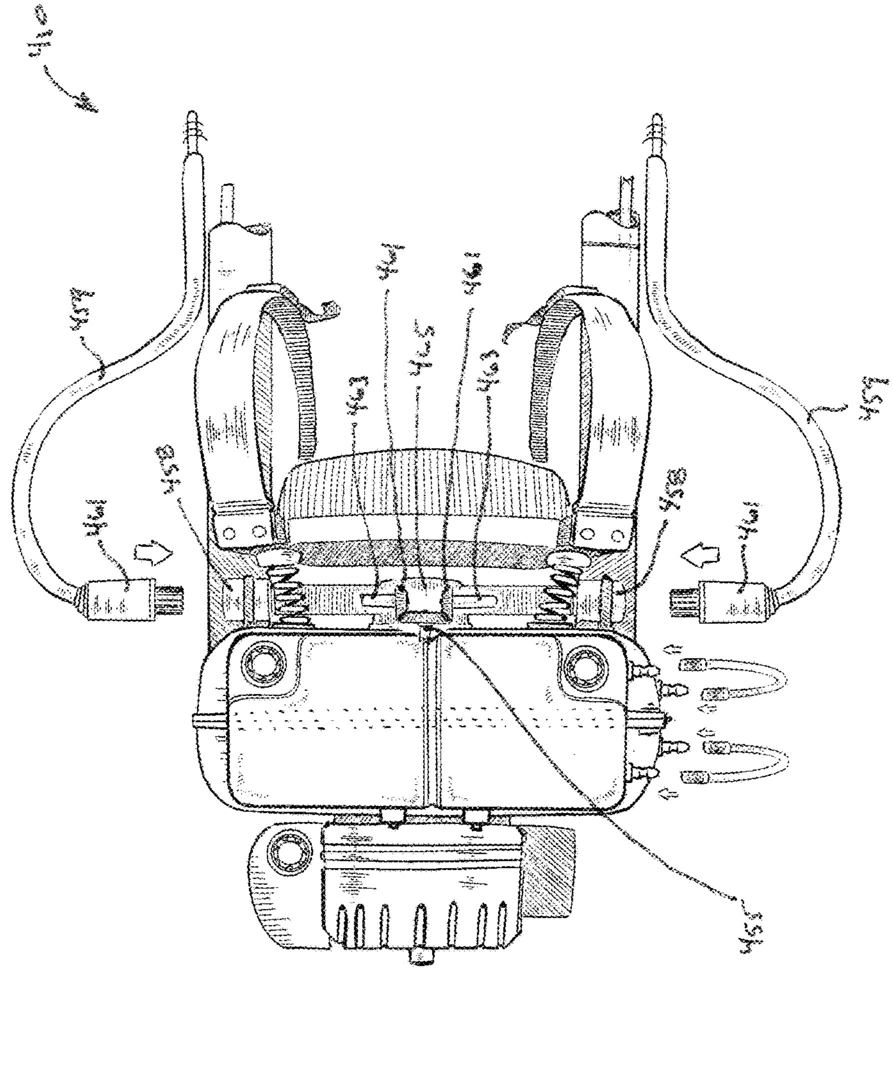
FIG. 15 illustrates a top view of a fourth embodiment of the systems and devices, and their various components, disclosed herein.

Referring to FIGS. 3-4, a spline drive housing 54 is disposed between the backpack 46 and the housing 14. Spline drive housings 254, 354 and 454 are likewise shown in FIGS. 5, 10 and 12, respectively. The spline drive housing includes a spline receiver 58 on one or both sides of the user to permit attachment of tools to each spline receiver 58. Within the housing, the spline drive includes a split hub differential 465, as disclosed in FIGS. 13-14. Alternatively, the spline drive housing can be attached to the back of housing 14. The blower of FIGS. 1, 3 and 4 can also be provided with mist ports 38 to incorporate a misting system as depicted in FIGS. 9-10. That is, a tank(s) 384, 388, frame 399 and tube system 298 as depicted in FIGS. 9-10 can be attached to the housing 14, thereby allowing for a user to mist with fertilizers, herbicides and pesticides concurrent with operation of the blower.

Figure 16:
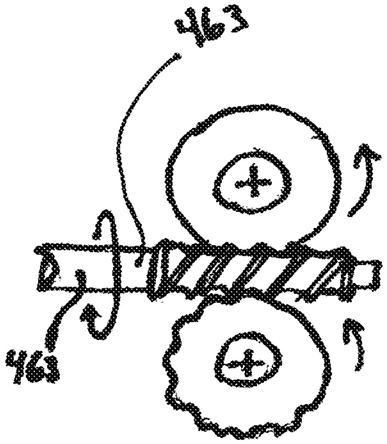
FIG. 16 illustrates a partial side view of a fourth embodiment of the systems and devices, and their various components, disclosed herein.

The blower can be operated by a gas-powered motor 18, or alternatively, an electric, battery-powered motor. In the case of an electric motor, rechargeable batteries are connected to the motor or the house to power the motor. In the case of a gas powered motor 18, 218, 318, 418, a fuel tank 62, 262, 362, 462 is provided, respectively. As readily recognizable in FIGS. 1 and 5, a power shaft 455 (FIGS. 13-14) of the motor extends through a central axis of impeller housing 14 and a central axis of spline housing 54 to drive both an impeller and the spline drive split hub differential 465 (depicted in FIGS. 13-14), which has a differential bevel gear 467 and spline gears 461. These spline gears 461, in turn, drives the spline drive shafts 463. Ultimately, spline shafts 463 drive the spline driven tools, such as line trimmer 404, or an edger. FIG. 16 depicts an alternative drive system with a screw-type head rotates shaft 463, which can be used instead of the bevel gear differential.

Referring to FIGS. 5-12, 15 and 17, a twin-tube, motorized blower is disclosed. As disclosed in FIGS. 5-8, the twin-tube, motorized blower 210 includes a motor 218, an impeller housing 214 (also illustrated as housing 314, 414 in FIGS. 9-12), a spline drive housing 254 and manifold 231, which includes runners 224 and 228. Manifold 231 (similar to manifold 331, 431) forms a plenum 225 (similar to plenum 325, 425) that receives air from the impeller housing 214. A flapper 268 (similar to flappers 268, 368 and 468) can be provided in the manifold to direct air into either runner 224 or 228, or both runners 224 and 228, thus allowing a user to selectively control the flow of air to each runner. A flow control knob 266 is provided to control the position of flapper 268. As depicted in detail in FIG. 7, manifold 231 is connected to port 228 by way of connector frame 230, which slides over rails 234 into position below port 228, and as depicted in FIG. 3, is secured with latch 50.

Figure 8:
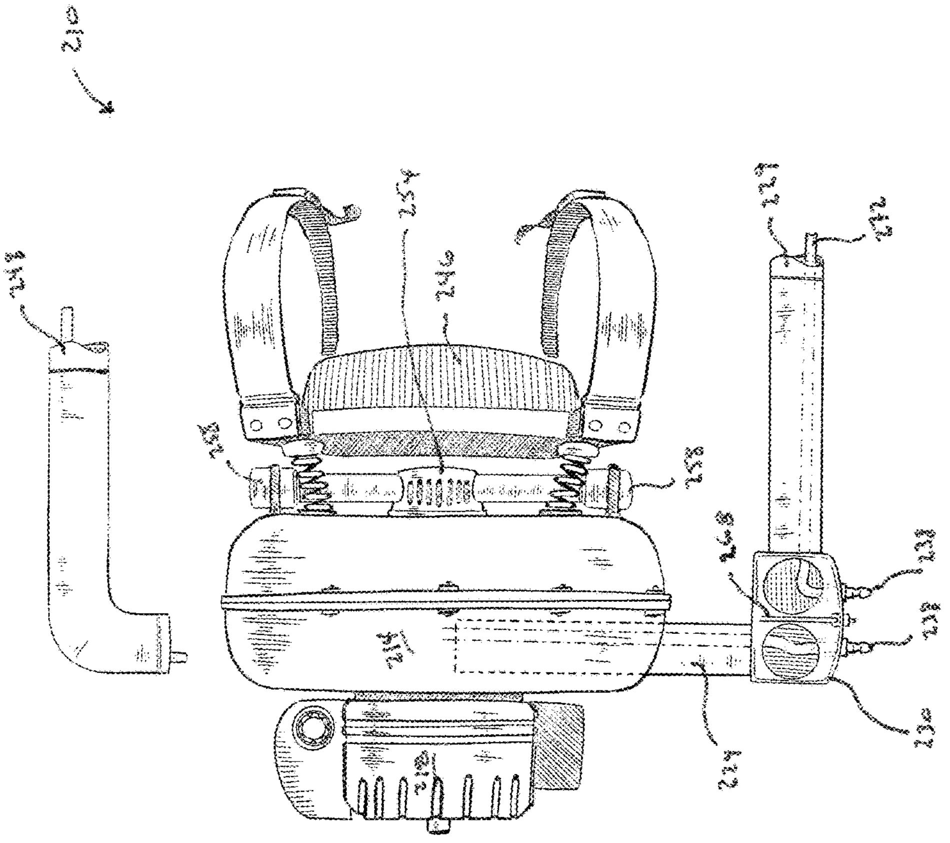
FIG. 8 illustrates a top view of a second embodiment of the systems and devices, and their various components, disclosed herein.
Figure 11:
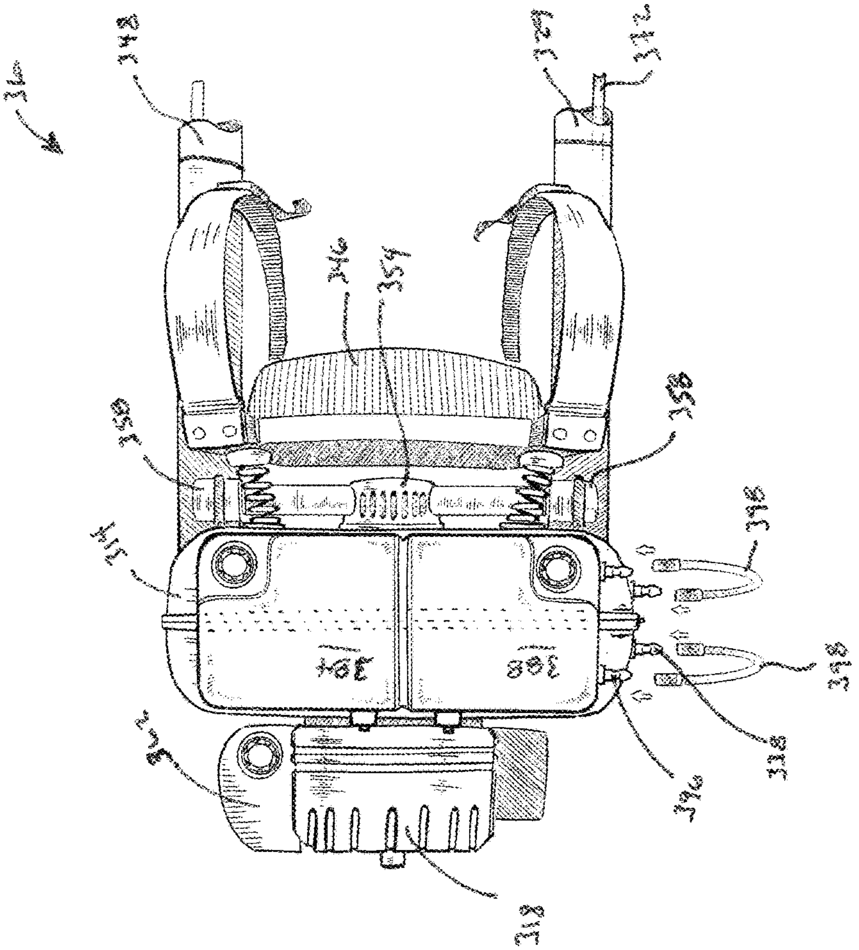
FIG. 11 illustrates a top view of a third embodiment of the systems and devices, and their various components, disclosed herein.

Referring to FIGS. 9-11, embodiments of platform 310 and 410 incorporate a manifold 331 and 431, respectively. In these platforms, multiple impellers can be provided within the impeller housing 314 or 414, respectively. For example, as shown in FIG. 8, two impellers (front impeller 276 and rear impeller 278) can be provided in a back to back configuration within the impeller housing 314 such that each impeller creates an air stream corresponding with a respective runner.

Additionally, as depicted in FIGS. 9-10, a tank mister system is provided. In one embodiment, two gravity fed tanks 384, 388 are used to deliver a liquid form fertilizer, herbicide or pesticide. Among many other uses, the tank mister system can be used to atomize/fog and deliver mosquito pesticides to a desired area. Alternatively, pressurized tanks, such as hand-pumped tanks, can be used to provide a further assist to distribution of the tank fluid. The tanks are seated on tank base 378, which is connected to frame 399. Frame 399 can be removably or permanently fixed to housing 314 (FIGS. 9-10), or in another embodiment, backpack 346. In addition, in-line, multi-way valves 392 are provided to permit a user to control the volume of fluid (if any) the user wants to disperse from tanks 384, 388. Tube 398 is connected to tank port 396 on one end, and mist port 338 (similar to mist port 238) on the other end to provide a passageway from tanks 384, 388 to an internal mist tube 372 (similar to mist tubes 272 and 472), and into runners 328, 324.

Figure 17:
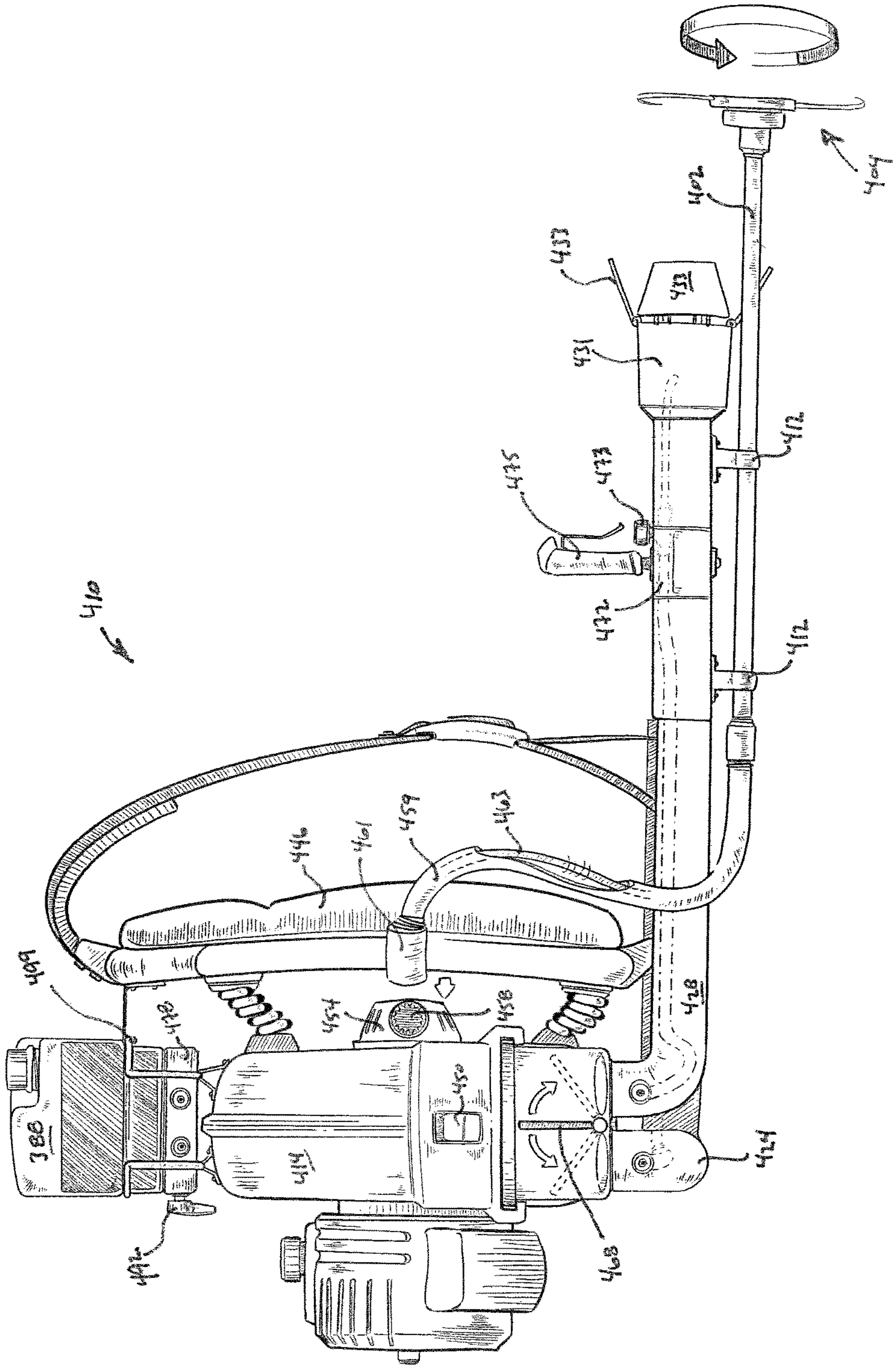
FIG. 17 illustrates a side view of a fourth embodiment of the systems and devices, and their various components, disclosed herein.
Figure 18:
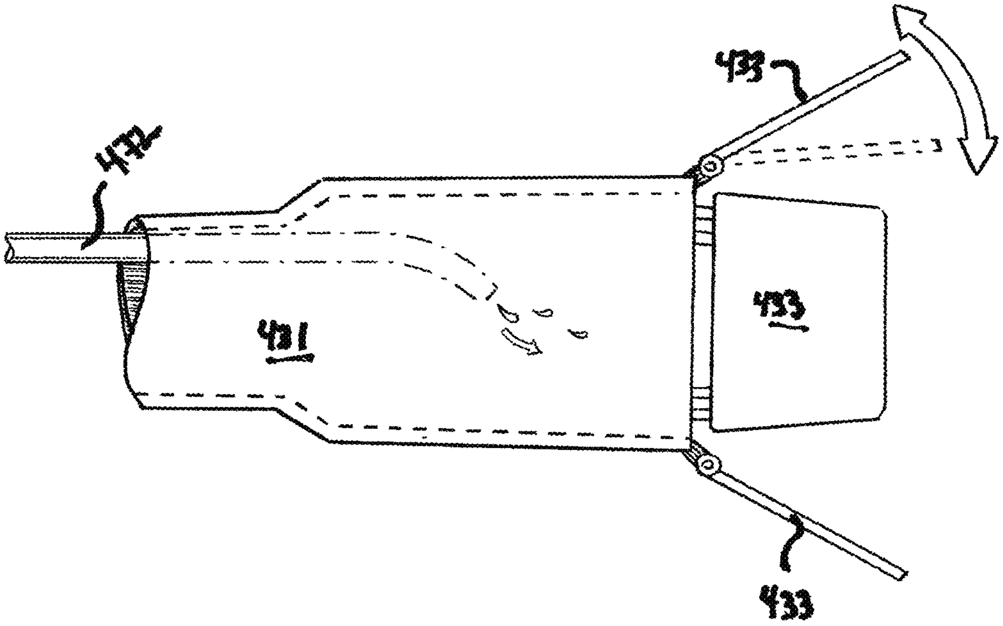
FIG. 18 illustrates a cross-sectional side view of a fourth embodiment of the systems and devices, and their various components, disclosed herein.
Figure 19:
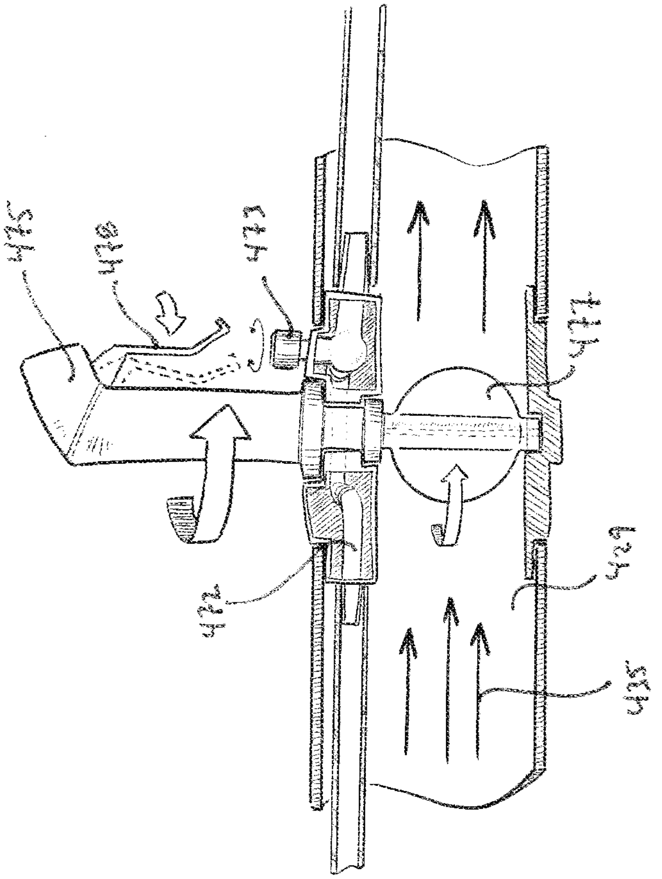
FIG. 19 illustrates a partial cross-sectional side view of a fourth embodiment of the systems and devices, and their various components, disclosed herein.

As depicted in FIGS. 17-19, the spline driven tool head 404 can be mounted or removably secured by tool mounts 412 to the blower 448. Preferably, tool head 404, and in particular, rigid spline rod 402, extends distally past beyond the blower end 431 to permit a user to operate both the tool head and the blower simultaneously, thus blowing away any debris created by the tool head. As shown in FIG. 17, a cutaway in the figure illustrates the spline drive shaft 463 in spline sleeve 459. Additionally, optional blower flaps 433 can be added to blower end 431 to allow the user to direct or focus the airstream during use.

FIG. 19 depicts a handle arrangement for use in connection with blower tubes 429, 448. As shown, for example, the user can use blower control handle 475 to control the movement and direction of blower tubes 429, 448. Handle 475 can also be used to both control the air and tool head throttle. A mist tube flow valve 472 is also provided to adjust/control the delivery of chemicals to be applied by user. Additionally, a dampener 477 can be added to dampen or stop airflow as needed. To avoid the pinching or dislodging of tube 472, a hub 474 is be provided to provide a protected passage for tube 472. As further shown in FIG. 18, tube 472 can extend blower end 431. Thus, as air travels in airflow direction 435, through blower end 431, any fluid is blown in the direction of the airflow.

Figure 20:
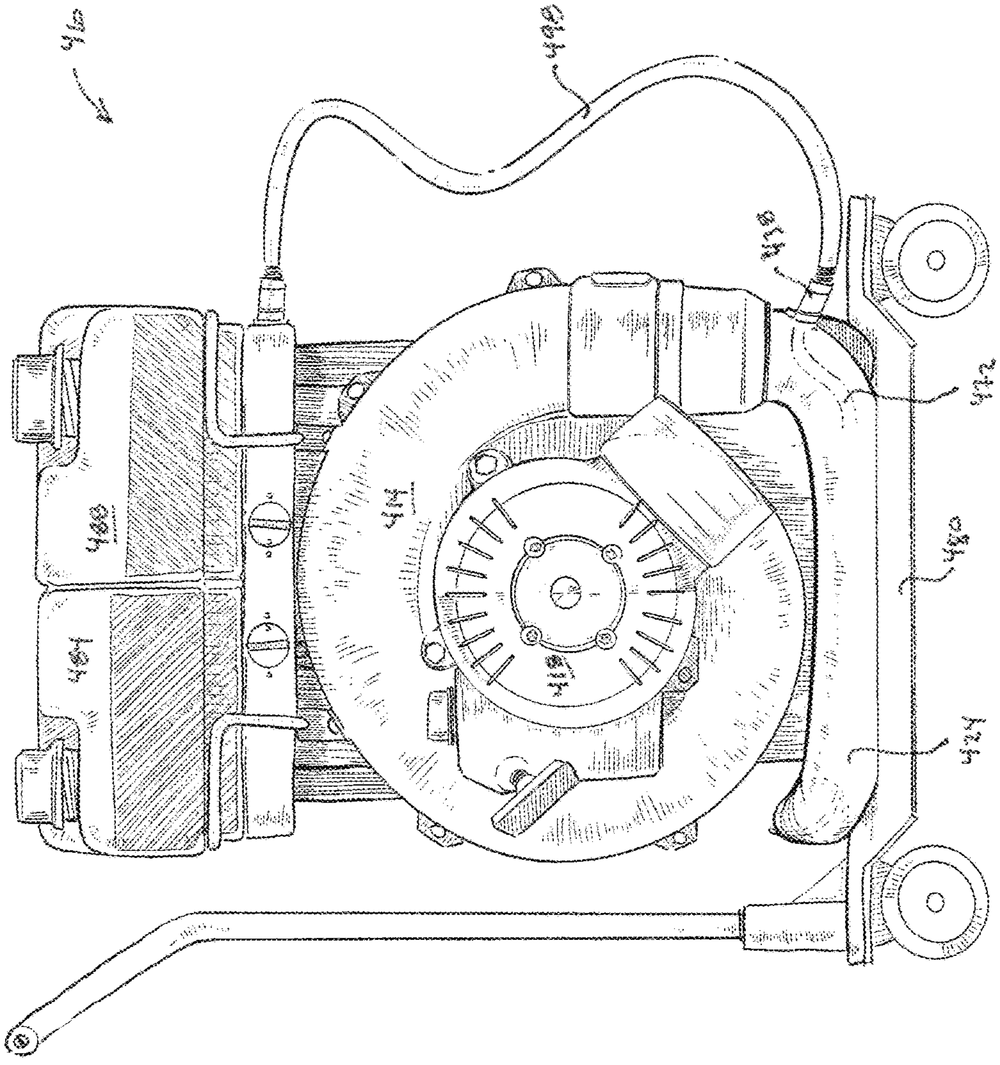
FIG. 20 illustrates a side view of a fifth embodiment of the systems and devices, and their various components, disclosed herein.

In an alternative embodiment shown in FIG. 20, blower 410 is fixed to a wheeled cart 480 or dolly to facilitate moving the blower over long distances from one section of a project to another.

This specification has been written with reference to various non-limiting and non-exhaustive embodiments or examples. However, it will be recognized by persons having ordinary skill in the art that various substitutions, modifications, or combinations of any of the disclosed embodiments or examples (or portions thereof) may be made within the scope of this specification. Thus, it is contemplated and understood that this specification supports additional embodiments or examples not expressly set forth in this specification. Such embodiments or examples may be obtained, for example, by combining, modifying, or reorganizing any of the disclosed steps, components, elements, features, aspects, characteristics, limitations, and the like, of the various non-limiting and non-exhaustive embodiments or examples described in this specification. In this manner, Applicant reserves the right to amend the claims during prosecution to add features as variously described in this specification.

What is claimed is:

1. A motorized lawn and leaf blower, comprising
a blower configured to be mounted to a backpack, the blower comprising:
a motor having a drive shaft;
an impeller connected to the drive shaft, wherein the drive shaft is configured to spin the impeller;
an impeller housing configured to contain the impeller and produce an airflow, the impeller housing comprising an air outlet port including a connector frame receiver rail;
a manifold configured to secure to the impeller housing, the manifold comprising:
a connector frame configured to slide into latched engagement with the connector frame receiver rail of the outlet port;
a plenum configured to receive the airflow from the impeller housing;
a runner duct attached to the plenum in a swiveling relationship with the plenum;
wherein the runner duct can rotate from a first position for right handed operation and a second position for left handed operation.

2. The motorized lawn and leaf blower of claim 1, further comprising:
a tank removably connected to the impeller housing;
a mist port connected to the runner duct, and a tube connecting the tank to the mist port, thereby forming a fluid connection between the tank and the mist port; and a valve connected to the first tube, thereby allowing a user to control the delivery of a fluid from the tank into the runner duct.

3. The motorized lawn and leaf blower of claim 1, further comprising:
a split hub differential operably connected to the drive shaft; and
a spline housing configured to contain the split hub differential.

4. The motorized lawn and leaf blower of claim 3, further comprising:
a drive tool having a working end and a drive end;
the split hub differential being configured to rotate the drive end of the spline drive tool.

5. The motorized lawn and leaf blower of claim 4, wherein the spline drive tool is one of a line trimmer and an edger.

6. The motorized lawn and leaf blower of claim 1 wherein the motor is an electric motor.

7. The motorized lawn and leave blower of claim 6 further comprising a battery connected to the electric motor.

8. A motorized lawn and leaf blower, comprising
a blower configured to be mounted to a backpack, the blower comprising:
a motor having a drive shaft;
an impeller connected to the drive shaft, wherein the drive shaft is configured to spin the impeller;
an impeller housing configured to contain the impeller and produce an airflow, the impeller housing comprising an air outlet port including a connector frame receiver rail;
a manifold configured to secure to the impeller housing, the manifold comprising:
a connector frame configured to slide into latched engagement with the connector frame receiver rail of the outlet port;
a plenum configured to receive the airflow from the impeller housing;
a runner duct attached to the plenum in a swiveling relationship with the plenum, wherein the runner duct can rotate from a first position for right handed operation and a second position for left handed operation;
a tank removably connected to the impeller housing;
a mist port connected to the runner duct, and a tube connecting the tank to the mist port, thereby forming a fluid connection between the tank and the mist port; and a valve connected to the first tube, thereby allowing a user to control the delivery of a fluid from the tank into the runner duct.

9. The motorized lawn and leaf blower of claim 8, further comprising:
a split hub differential operably connected to the drive shaft; and
a spline housing configured to contain the split hub differential.

10. The motorized lawn and leaf blower of claim 9, further comprising:
a drive tool having a working end and a drive end; and
the split hub differential being configured to rotate the drive end of the spline drive tool.

11. The motorized lawn and leaf blower of claim 10, wherein the spline drive tool is one of a line trimmer and an edger.

12. The motorized lawn and leaf blower of claim 8 wherein the motor is an electric motor.

13. The motorized lawn and leaf blower of claim 12, further comprising a first battery connected to the electric motor.

14. The motorized lawn and leaf blower of claim 13, further comprising a second battery connected to the electric motor.

15. A motorized lawn and leaf blower, comprising
a blower configured to be mounted to a backpack, the blower comprising:
an electric motor having a drive shaft;
an impeller connected to the drive shaft, wherein the drive shaft is configured to spin the impeller;
an impeller housing configured to contain the impeller and produce an airflow, the impeller housing comprising an air outlet port including a connector frame receiver rail;
a manifold configured to secure to the impeller housing, the manifold comprising:
a connector frame configured to slide into latched engagement with the connector frame receiver rail of the outlet port;
a plenum configured to receive the airflow from the impeller housing; and
a runner duct attached to the plenum in a swiveling relationship with the plenum, wherein the runner duct can rotate from a first position for right handed operation and a second position for left handed operation;

a tank removably connected to the impeller housing;

a mist port connected to the runner duct, and a tube connecting the tank to the mist port, thereby forming a fluid connection between the tank and the mist port; and a valve connected to the first tube, thereby allowing a user to control the delivery of a fluid from the tank into the runner duct;

a split hub differential operably connected to the drive shaft;

a spline housing configured to contain the split hub differential;

a drive tool having a working end and a drive end; and the split hub differential being configured to rotate the drive end of the spline drive tool.

16. The motorized lawn and leaf blower of claim 15, further comprising a first battery connected to the electric motor.

17. The motorized lawn and leaf blower of claim 16, further comprising a first battery connected to the electric motor.

* * * * *